United States Patent [19]
Garcia

[11] 3,946,314
[45] Mar. 23, 1976

[54] REMOTE CONTROL PROGRAMMING SYSTEM

[75] Inventor: Jose Juan Garcia, Madrid, Spain

[73] Assignee: Industrias Rumbo, S.A., Madrid, Spain

[22] Filed: Dec. 19, 1973

[21] Appl. No.: 426,126

[30] Foreign Application Priority Data
Dec. 19, 1972  Spain .................................. 409800

[52] U.S. Cl. .................... 325/51; 325/64; 325/393; 325/396
[51] Int. Cl.² .......................................... H04B 1/00
[58] Field of Search ....... 325/51, 53, 54, 55, 56–58, 325/64, 390, 391, 393, 394–396; 178/DIG. 15, DIG. 9; 340/147 C, 18 F

[56] References Cited
UNITED STATES PATENTS

| | | | |
|---|---|---|---|
| 1,917,881 | 7/1933 | Germanton | 325/390 |
| 2,007,165 | 7/1935 | Hulse et al. | 325/391 |
| 2,226,692 | 12/1940 | Brunner | 325/393 |
| 2,370,736 | 3/1945 | Kittredge | 178/DIG. 9 |
| 2,563,127 | 8/1951 | McGoffin | 325/55 |

*Primary Examiner*—Benedict V. Safourek
*Assistant Examiner*—Jin F. Ng

[57] ABSTRACT

In a programming device for controlling the selective transmission of a signal to selected receivers at preselected times, commutators have their slides moved by remote control to selected commutator bars. A timing device makes connections through the commutator bars, the slide of each commutator making a connection at a different time to each different commutator bar of a given commutator. The connection made by the timing device through a commutator bar energizes a relay, which closes the circuit between the transmitter and the corresponding receiver. Parallel circuits are provided from the circuit to the transmitter to energize the transmitter only when at least one of the receivers is connected to receive. The individual commutators may each be brought to a home position also by remote control. The commutators may be mechanically driven by a motor or may be driven by stepping motors.

7 Claims, 3 Drawing Figures

REMOTE CONTROL PROGRAMMING SYSTEM

SUMMARY OF THE INVENTION

The present invention relates to an improved programmer which controls the selective timed transmission of signals from transmitters to receivers where the signals are reproduced. The programmer combines the advantage of a completely automatic programming, without regard to the order in which the signals are transmitted to different receivers; another advantage of the programmer is its ability to disconnect one of the receivers without having to disconnect the other receivers that are working; whereas, upon disconnecting all of the receivers, the signal source is automatically disconnected.

The programmer also has the advantage that, upon disconnecting a given receiver, which can be done from the receiver, the receiver will be unable to receive any signal until it is programmed again to receive a signal, and it includes the capability of being disconnected without being de-programmed, that is, the disconnection of the reproducing system even though the central system is not de-programmed.

A further advantage consists in the fact that, with the same type of programming, it is possible by enlarging the memory to achieve the programming of the desired number of actions over a considerable time period, since there is the possibility of connecting the receiver to receive the signal at any desired moment, independently of whether or not this be the moment selected by the central system program.

DESCRIPTION OF THE PREFERRED EMBODIMENT

Figure 1:
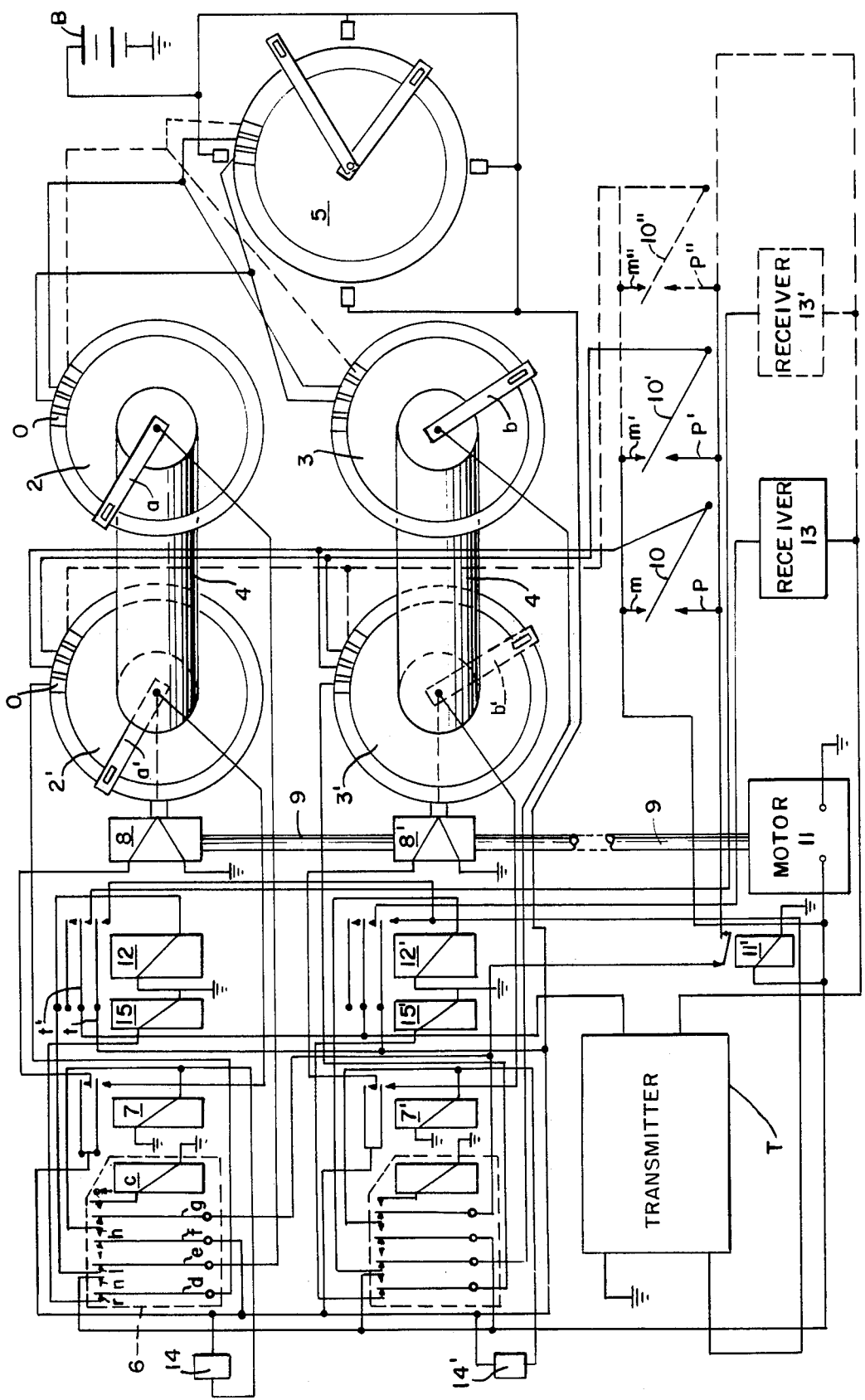
FIG. 1 is a circuit diagram representing the programmer of the invention.

Only part of the programmer circuit is shown in FIG. 1. The circuit programmer can be enlarged indefinitely adding commutators with their circuits to those illustrated.

As shown in FIG. 1, a programmer comprises a series of commutators $2, 2', 3, 3'$ . . . with a series of commutator bars, each provided with its respective slide $a, a'$ . . . where $a$ and $a'$ function synchrounously, $b$ and $b'$ also function synchronously, etc., that is, when the contact of slide $a$ touches a given commutator bar of commutator 2, the contact of slide $a'$ touches the corresponding commutator bar of commutator $2'$. The synchronizing mechanism is represented in the drawing by the connecting shaft designated by reference number 4. The synchronization may be achieved by many other mechanical methods, such as, for example, by utilizing double-faced commutators, whose slides are joined by the same axle, etc. Similarly, these commutators may be composed of stepping motors that position the slide at the desired commutator bar by means of the number of pulses received. The function of the programmer is to move the slides $a, b$, etc. to the appropriate commutator bars of their respective commutators in order to close a circuit to transmit a signal to a selected receiver at a moment in time selected by a chronometric system 5. In the illustrated example, slides $a'$ and $b'$ and slides $a$ and $b$ are mechanically constrained to occupy corresponding positions. The positioning of the slides $a, a'$ is achieved by depressing the key 6, which locks in a depressed position until unlocked by energization of the electromagnet c. When key 6 is depressed, current from DC power source B passes through contact $f$ to contact $h$, energizing an ordinary double contact relay 7, which in turn sends current over one contact to slide $a'$ and over the other contact the electromagnetic clutch 8 which transmits rotation of the axle 9 to the slide $a'$ when energized.

The current which passes through slide $a'$ flows through the commutator bar that the former touches to one of the switches 10, 10', corresponding to such commutator bar. Each commutator bar represents a given moment in time, and the commutator bar contacted by the slide $a$ is selected by the programmer. If the switch 10, 10' to which current flows is in the position shown in the illustration, that is not depressed, the current passes through contacts $m, m'$ to the motor 11 which drives the axle 9 at a reduced speed through a variable reduction drive mechanism. The commutator bar o corresponds to the deprogrammed position. When the contact of slide $a'$ touches the bar $0$, the contact of slide $a$ touches the corresponding bar $o$ of commutator 2, a bar that is not connected to any circuit. Whenever slide $a'$ contacts bar $o$ of commutator $2'$, current will pass from bar $o$ through contact $d$ of the key 6 to contact $n$, if the key 6 is depressed, and from there to the motor 11 so that the slide $a'$ will not be stopped on commutator bar $o$ when the key 6 is depressed. As pointed out above, the key 6 locks in depressed position when actuated and is unlocked by energization of electromagnet c. A separate electromagnet c may be employed for unlocking each key switch 6 as shown in FIG. 1 or a simple electromagnet which is common to all of the switches of the system may be used to unlock all of the locked switches.

If one of the two position switches 10, 10' were depressed, that is connecting the contacts $p, p'$, the current from the corresponding commutator bar, instead of passing to the contact $m, m'$ will pass to the corresponding contact $p, p'$, both of which lead to the same conductor which is connected by a contact of a relay 11 to the contact $g$ of the key 6. When the key 6 is depressed, contact $g$ connects with the contact $q$ which is connected to the electromagnet c. Thus, current from the commutator slide $a'$ passing through contact $p, p'$, will energize electromagnet c unlocking the key 6, thereby de-energizing the relay 7, de-energizing the electromagnetic clutch 8 and interrupting the current passing through the slide $a'$. At the same time the motor 11 is de-energized, because the current that powered the motor 11, originating from the contacts $m, m'$ is interrupted because the switch 10, 10' connected to the commutator bar contacted by the slide $a'$ is depressed. The relay 11' will open its contacts whenever the motor 11 is energized, thus preventing unlocking of key 6 except when the motor 11 is de-energized.

As a result of the above described operation, the slide $a'$ is retained on the desired commutator bar corresponding to the depressed key 10, 10', positioning slide $a$ in a corresponding position whereby the circuit corresponding to a selected time is closed. The slides of the system 5 connect the DC power source B to different commutator bars of the commutator 2, 3 at different times. When the system 5 connects the power source to a commutator bar engaged by the slide $a$, $b$, the current coming from the power source will pass through that slide, to the contact $e$ of the key 6 which, if it is not depressed, passes the current on to contact 1 and from there to the locking relay 12. The relay 12 may be designed to automatically disconnect itself when it locks, in order to avoid waste of energy. The current passes through contacts $e$ and 1 of the key 6 so that the relay 12 will not be energized when the key 6 is depressed.

The locking relay 12, 12' in principle, controls two independent circuits: one of them, upon the energizing of the relay, energizes the signal generator of the transmitter T causing it to generate its signal while the other circuit connects the output signal of the transmitter T to the receiver 13, 13' corresponding to the relay 12, 12'.

The separate locking relays of the system, 12, 12', act as parallel switches to energize the transmitter signal generator; that is, as long as one of them is closed the latter is energized while, if none of them is closed, the latter is de-energized.

When the signal is being received by a receiver 13, 13', it may be interrupted and the central system may be de-programmed by depressing the switches 14, 14', located at the receivers 13, 13' which are receiving the transmitted signal. For example, by depressing switch 14, the current passes to the relay 7 which closes its contacts sending the current to the slide $a'$ and to the electromagnetic clutch 8, thereby starting rotation of the slides $a'$, $a$, by means of the motor 11 energized through the switches 10, 10', which will no longer be depressed. These slides $a$, $a'$, will continue moving until they reach the commutator bars $o$, where they will stop. The current passing through slide $a'$ flows to contact $d$ of the switch 6 which, not being depressed, passes the current to contact $r$ and from there to the unlocking relay 15, which thereby releases the locking relay 12, thus disconnecting the receiver 13' from the transmitter T as well as opening one of the parallel power circuits of the transmitter signal generator. The signal generator will be then de-energized if the other receivers are not connected to the transmitter. The return of the slide to commutator bar $o$ is referred to as de-programming the system.

When it is desired simply to disconnect the receiver without de-programming the system, the switch 14 would be connected to energize the unlocking relay 15, thereby obtaining the disconnection of the receiver without moving the keys and, therefore, without de-programming.

As it was mentioned earlier, the memory programming system may also be implemented by stepping motors. With stepping motors, the system does not change substantially, since it still comprises the positioning of a slide onto a given commutator bar, the only change being in the manner in which the slide is brought to the selected bar. A pulse generator would send pulses to each switch 10, 10'. The pulses would pass through each switch 10, 10' to the stepping motors until the slide connects to a depressed switch 10, 10' through a commutator bar.

When it is desired to be able to send a signal after having programmed considerably far in advance, another programmer like that already described would be used. The locking relays 12, 12' would be replaced by stepping motors and the unlocking relays 7, 7' by the respective systems that set the stepping motors to zero.

The commutator bars of these stepping motors would each connect to a commutator bar of the second programmer that is added, while the slide corresponding to these commutator bars would transmit the signal to be given. This current would be transmitted by means of the slide of the stepping motor that would have been substituted for the locking relay.

The slides of the second programmer would be linked to respective slides, and their functioning would be similar to that of the commutators 2', 3', but they would terminate in a second set of the switches 10, 10'. As a result, by making use of the same system of switches, it is possible to program the chosen time (hour and minute, for example) as well as the number of intervals (for example, each 12 hours) that are desired to have elapsed before a receiver is put into operation. Also in this case, there would be two options, the first being that the system could be de-programmed by performing this action in the manner previously described, while the other being that the programmed action could be repeated following a period that is a multiple of the period of intervals that are desired to elapse before the receiver is put into operation. For this option, the contacts $p$, $p'$ would not connect to the unlocking electromagnet of the key $c$, but to a new relay or element that performs the same fumction, starting the second programmer.

In order to enlarge the programming system from 10 receiving points (as in the example of FIG. 1) to 30, 40, 200, etc. points receiving the signal, it will be necessary to alter the keyboard system 6, by substituting for it ten mechanical locking switches that represent the units, ten more that represent groups of ten, and as many circuits as are hundreds of points that must receive the signal and, finally, as many keys or locking switches as represent the hundreds, having only one circuit each.

Figure 3:
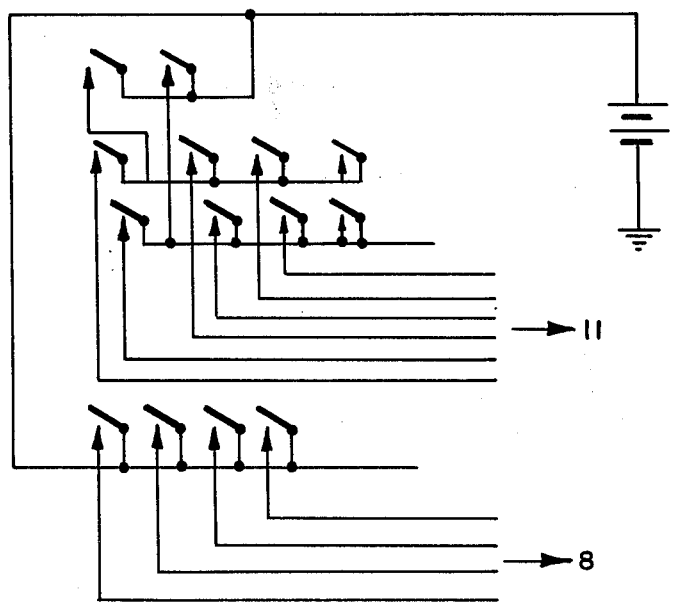
FIG. 3 illustrates a circuit for control switches that can be used with the system.

Ten single output connections of the switches representing the hundreds are independently connected with each one of the circuits of the switches representing the groups of ten as illustrated in FIG. 3. The contacts of the switches of the groups of ten energize the motor which moves the group corresponding to each ten sets of commutators 2, 2', . . . 3, 3', . . . etc., whereby it is not necessary to provide an independent key or switch for each point that must receive the signal.

All these keys are provided with an unlocking electromagnet connected to the contacts $p$, $p'$, passing through the contact of the relay 11'.

Figure 2:
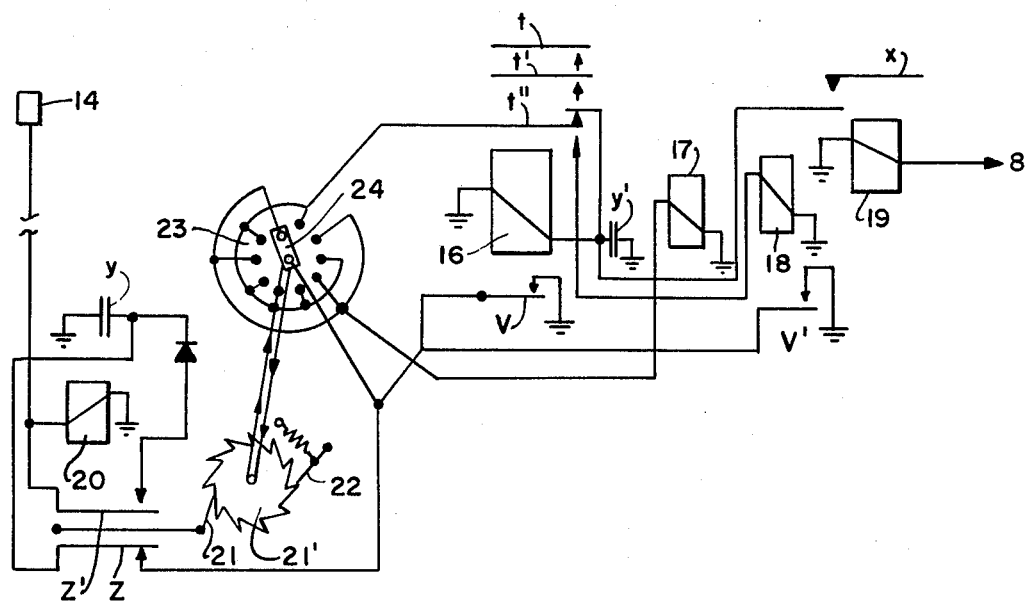
FIG. 2 illustrates a modification of the circuit of FIG. 1.

When it is desired to use the system of the invention to receive a programmed signal and an extemporary signal, a system shown in FIG. 2 is added to the system of FIG. 1 whereby the elimination of the commutator bar $o$ of the corresponding programmer is obtained since de-programming takes place through the inserted system. The system of FIG. 2 is inserted in place of the set of relays 12 and 15.

When the key 14 in FIG. 2 is depressed, it activates the electromagnet 20, which attracts the armature 21, setting into motion the cog-wheel 21', provided with a catch 22 to prevent retrogression, and charging the condenser $y$. Upon releasing the key 14, the armature 21 returns to its position, connecting the condenser $y$ through the contact $z$ with the slide 24 of the commutator 23 and from there to the condenser $y'$, which is charged (avoiding the vibratory effect of the contacts $t$, $t'$ and $t''$). At the appropriate time, condenser $y'$ will operate the locking relay 16, which locks the contacts $t$, $t'$ and $t''$ and discharges the condenser $y$ through the contact v, which will be disconnected when the relay 16 ceases receiving current, so that the current coming from the condenser y does not pass through the contact t'' to the relay 18. The contacts t and t' are the same as that shown in FIG. 1 and in this manner, the circuit of FIG. 2 connects to the system of FIG. 1.

When the system is in this position, in order to disconnect it without de-programming, the key 14 is depressed again and by the same proocess the condenser y is charged and the slide 24 of the commutator 23 will go on to the next contact, sending the current from the condenser y to the unlocking electromagnet 17 that releases the contacts t, t', t''. The electromagnet 16 is connected to receive the signal from the programmer through the contacts x, which signal originates from the contact 1 of the corresponding key 6.

This signal will pass to the condenser y' and to the locking relay 16 which locks the contacts t, t' and t'', whereby the system is automatically connected at the preselected moment as described above with reference to FIG. 1.

In order to interrupt the signal, upon depressing again the key 14, the process of charging the condenser y is repeated, and it is discharged by releasing the key 14 through the slide 24 which, through the next contact connects to the locked contact t'', and from there to the unlocking relay 18.

The unlocking relay 18, upon receiving the signal from the condenser y, unlocks the relay 16 and at the same time locks the contact x open, and the condenser y is discharged through the contact v', similar to the operation of contact v. The unlocking relay 18 locks only the contact x, thereby interrupting the possible command current of relay 16 which may come from the contact 1 of the key 6, but it leaves the relay 16 free to function at any time without receiving the current from the contact x.

When programming again, the current of the electromagnetic clutch 8 passes current through a connection to the unlocking relay 19, the only purpose of which is to unlock the contact x of the relay 18.

As it was noted, the commutator 23 has two series of alternate contacts so that their number shall be even, while the number of cogs of the wheel 21' shall be equal to or a multiple of the number of contacts of the commutator 23.

The device described can accommodate modifications, such as replacing the relays with other devices that perform the same function, and also other parts may be replaced by elements that perform the same function and carry out the same task, such as pulse commutators or transistors in lieu of plain programmers, etc. These and many other modifications may be made to the above described specific embodiment of the invention without departing from the spirit and scope of the invention as defined in the appended claims.

I claim:

1. A programming system for controlling the selected transmission of a signal at preselected times comprising a transmitter, a plurality of receivers, a plurality of relay means one for each of said receivers for connecting the corresponding receiver to said transmitter when such relay means is energized, a plurality of commutator means one for each of said relay means, each commutator means having a plurality of commutator circuits and being operable to select one of its commutator circuits and provide a connection between said relay means and the selected one of the commutator circuits thereof, and means to provide power to the commutator circuits of said commutator means at different preselected times to energize each of said relay means at a preselected time corresponding to the commutator circuit selected by the corresponding commutator means to thereby connect said transmitter to the corresponding receiver at the preselected time.

2. A programming system as recited in claim 1 comprising means independent of said commutator means for energizing any selected one of said relay means at any selected extemporary time.

3. A programming system as recited in claim 1 further comprising key switch means for controlling said commutator means to determine the commutator circuit selected by each of said commutator means.

4. A programming system as recited in claim 3 further comprising de-programming means for de-programming said commutator means whereby none of said commutator circuits is selected by said commutator means.

5. A programming system as recited in claim 1 wherein said commutator means comprises a sliding contact connected to the corresponding relay and selectively engaging a plurality of commutative bars each of which comprises a different one of said commutator circuits.

6. A programming system as recited in claim 5 wherein each of said commutator means comprises a second sliding contact which selectively engages a second set of commutator bars with means to maintain the position of the two sliding contacts of each commutator means in a corresponding position and further comprising means responsive to the connections made by the second sliding contact of each of said commutator means to remotely control the positioning of the sliding contacts of each of such commutator means.

7. A programming system as recited in claim 6 further comprising means for causing the sliding contacts of said commutator means to move to a predetermined home position.

* * * * *